United States Patent [19]

Tantlinger

[11] 3,842,927

[45] Oct. 22, 1974

[54] BUS WITH REPLACEABLE POWER UNIT

[75] Inventor: Keith W. Tantlinger, Coronado, Calif.

[73] Assignee: Rohr Industries, Inc., Chula Vista, Calif.

[22] Filed: Jan. 22, 1973

[21] Appl. No.: 325,630

[52] U.S. Cl................... 180/11, 180/56, 180/64 L
[51] Int. Cl............................................. B60k 5/10
[58] Field of Search............ 180/12, 11, 54 F, 54 A, 180/55, 62, 64 M, 56, 57, 58, 59, 64 L; 296/28 A

[56]  References Cited
UNITED STATES PATENTS

| | | | |
|---|---|---|---|
| 1,727,721 | 9/1929 | Langlands | 180/64 L |
| 2,000,360 | 5/1935 | Stout | 180/56 |
| 2,107,606 | 2/1938 | Gemmer | 180/57 |
| 2,209,457 | 7/1940 | Hare | 180/56 |
| 2,227,379 | 12/1940 | Quartullo | 180/57 |
| 2,305,936 | 12/1942 | Tjaarda | 180/56 |
| 3,115,945 | 12/1963 | Dry et al. | 180/56 |

FOREIGN PATENTS OR APPLICATIONS

| | | | |
|---|---|---|---|
| 457,792 | 12/1936 | Great Britain | 180/11 |

Primary Examiner—M. Henson Wood, Jr.
Assistant Examiner—Victor N. Sakran
Attorney, Agent, or Firm—Patrick J. Schlesinger

[57]  ABSTRACT

A substantially flat, structural bulkhead is mounted ahead of the designed rear end of a bus body to comprise the structural rear wall of the bus body and also the forward wall of a power unit compartment provided at the after end of the bus body. Non-structural doors complete the sides and rear of the compartment, and conform to the designed contours of the rear end of the bus body. These doors may be swung wide to provide access to the power unit for routine inspection, maintenance and adjustment. A complete power unit, comprising the bus propulsion engine, accessory equipment, drive axle, rear support and drive wheels, and heating and air conditioning equipment, is constructed as an integrated unit exteriorly of the bus, and is rolled into said compartment on its own wheels and secured in operative position therein by releasable connections. For major overhaul or repair, the complete power unit, can be quickly released, rolled out of the compartment, and replaced with a spare power unit, pre-tested, pre-run and ready to operate.

11 Claims, 6 Drawing Figures

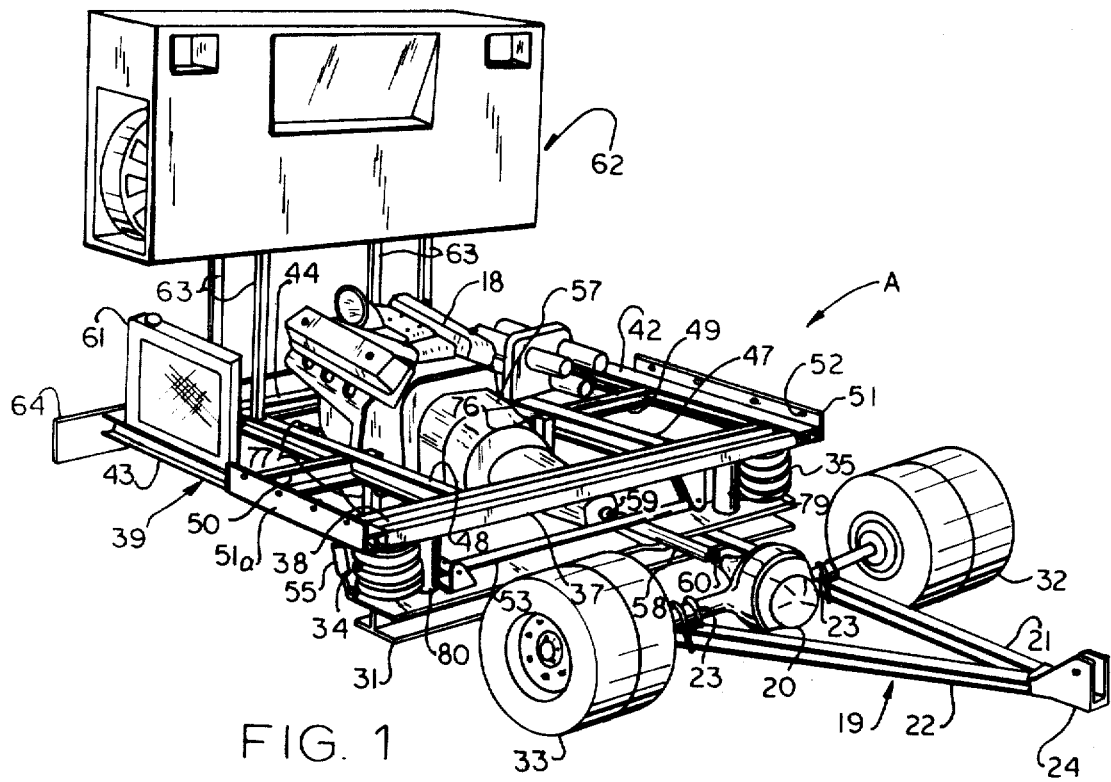
FIG. 1
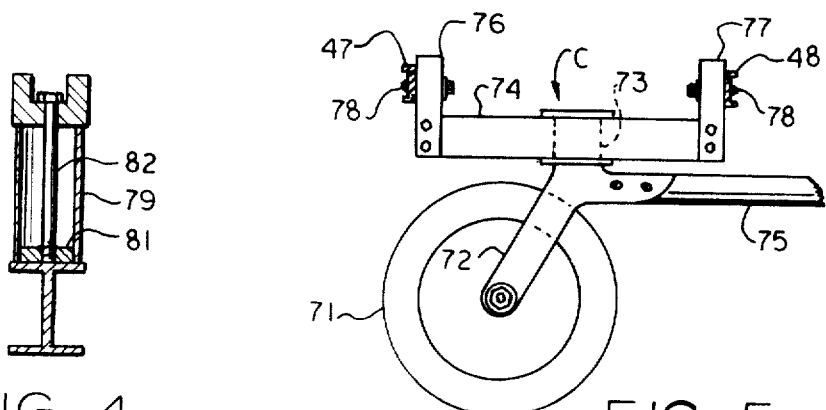
FIG. 4
FIG. 5

PATENTED OCT 22 1974 3,842,927

BUS WITH REPLACEABLE POWER UNIT

BACKGROUND OF THE INVENTION

In the building and operation of buses, the installation and performance of major maintenance and repair on the principal mechanical elements of the buses, comprising engines, engine accessories, transmissions, rear axles, suspensions, and heating and air conditioning equipment, is expensive and time consuming, and results in substantial down time for the buses involved. In accordance with prior art practice, the engine, heating and air conditioning mechanisms are incorporated in the bus body in a manner which requires the special shaping of structural elements to the designated shape of the rear end of the vehicle, and also involves the cutting away of other structural elements in order to accommodate the various mechanisms. Such structural incorporation into the bus body of the various mechanical elements, in addition to the problems mentioned previously herein, makes difficult the isolation of the passenger compartment from the noise and heat generated by the operation of said mechanisms, and adds substantially to cost, since the incorporation of necessary structural strength into members shaped to the design contours of the rear end of the bus is difficult and expensive.

PURPOSE OF THE INVENTION

A primary objective of the present invention is to provide a removable power unit mounted on the rear drive wheels of a bus, and which can be rolled into and out of operative position in a compartment provided in the after end of the bus body. The forward end of the compartment being provided by a structural bulkhead which is (1) forward of the rear end of the vehicle, (2) flat or of substantially flat segment, (3) strong, (4) insulative and (5) relatively inexpensive, and the rear of the compartment is closed by doors and grilles shaped to the design contours of the rear end of the bus.

The power unit thus provided comprises the propulsion engine, accessories, rear drive wheels, rear axle, suspension and transmission, and preferably also heating and air conditioning equipment, means being provided for releasably anchoring said power unit in operative position in said compartment, and for quickly releasing said power unit for roll-out removal and replacement, the forward end of the compartment comprising a flat or substantially flat structural, insulative bulkhead, and the sides and rear of the compartment being closed by doors conforming to the designed contours of the after end of the bus body to close off the compartment during operation of the bus, but to open wide when required to expose all elements of the power unit for routine inspection and maintenance.

BRIEF DESCRIPTION OF THE DRAWINGS

The foregoing objectives and advantages of the invention will be apparent from the following description and accompanying drawings, wherein:

FIG. 1 is a perspective view of a power unit embodying the invention, conventional elements, such as hoses, wiring, accessories, controls, exhaust, etc. being omitted for the sake of simplicity.

FIG. 4 is an enlarged, diametrical sectional view through a tube and bolt tie-down used when the power unit is removed from a bus.

FIG. 5 is a side elevational view of a pivoted support wheel structure for use when the power unit is removed from a bus.

DETAILED DESCRIPTION OF THE DRAWINGS

Figure 2:
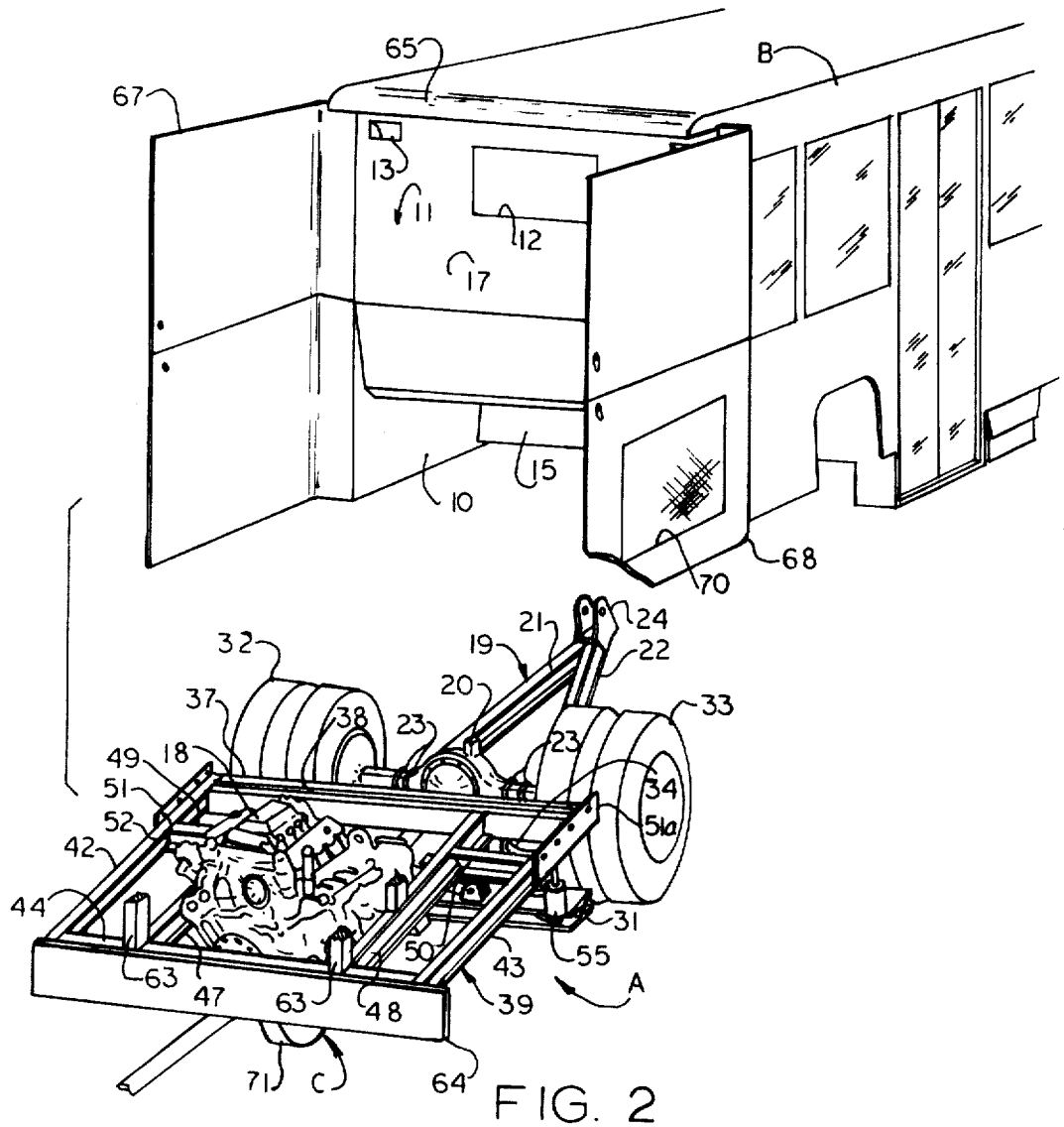
FIG. 2 is a fragmentary, perspective view showing the power unit being rolled into position in the rear compartment provided in the bus body, the body having been raised to admit the power unit.
Figure 3:
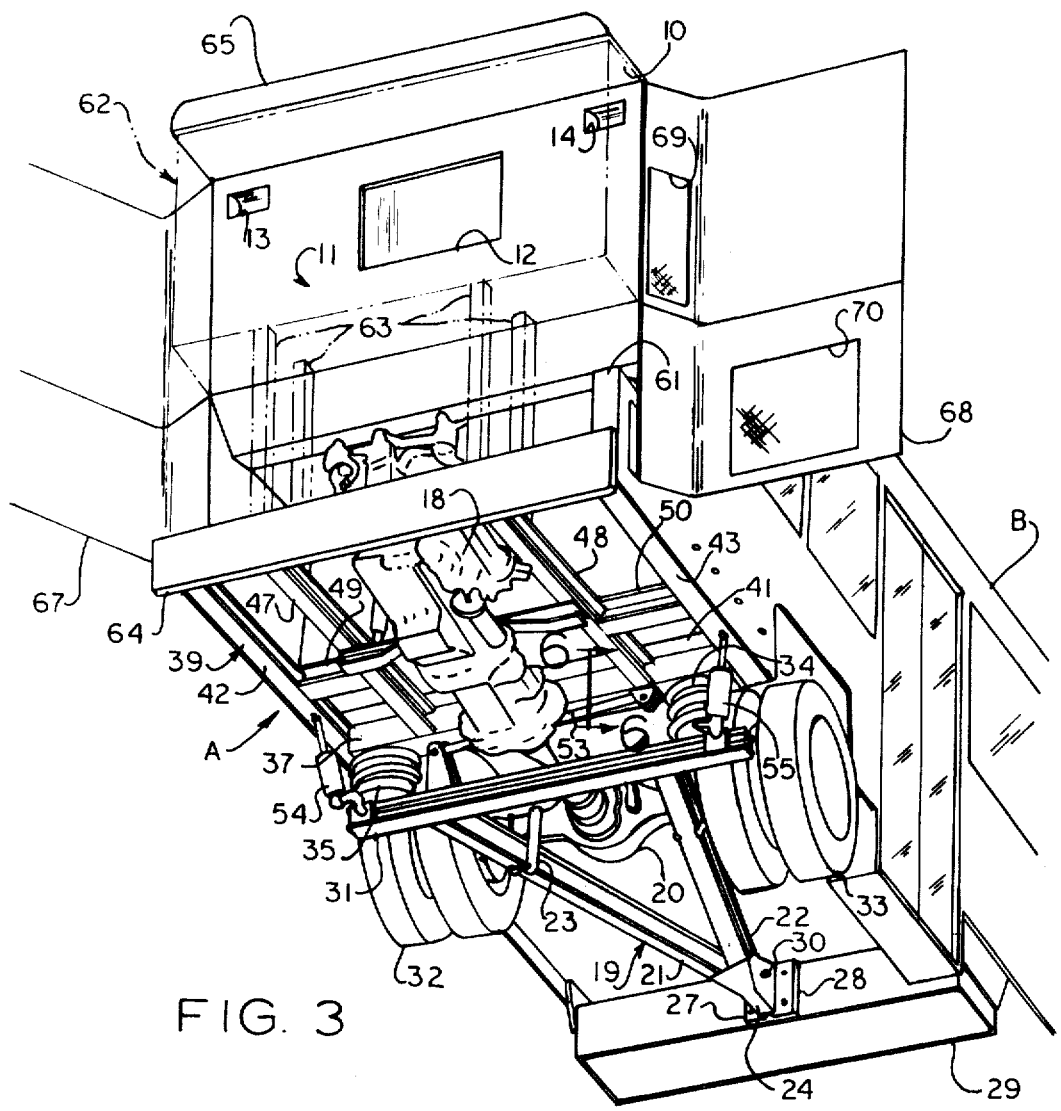
FIG. 3 is a fragmentary, perspective view from the rear and beneath the bus shown in FIG. 2 after the power unit has been rolled to "docked", operative position in its compartment, the air conditioning unit being outlined in broken lines.

Referring to the drawings in detail, a removable power unit A embodying the invention is constructed and arranged to be completely assembled as an integrated working unit exteriorly of the bus body in an optimum working position, and all element thereof completely tested under operating comditions. The power unit is then rolled into, and "docked" in operative position in a compartment 10 provided therefor in the rear end of a bus body B. The forward wall 11 of the compartment 10 is a strong, simple, substantially flat bulkhead which also comprises the structural rear wall of the bus body. The bulkhead 11 is provided with openings 12, 13 and 14 as required, see FIGS. 2 and 3, for communication between the compartment 10 and the passenger compartment of the bus body forwardly of the wall 11. The lower portion 15 of the wall 11 is offset forwardly from the upper portion 17 thereof to accommodate the bus propulsion engine 18 as shown in FIGS. 2 and 3. This rear wall 11 preferably is of highly fire retardant construction, and also preferably with high thermal and acoustical insulative properties.

A thrust fork 19, for transmitting driving and braking forces from a rear axle housing 20 to the bus body B, comprises a pair of forwardly converging beams 21 and 22, firmly secured by suitable means, such as U-bolts 23, beneath opposite sides of the axle housing 20. The convergent forward ends of the fork beams 21 and 22 are secured together and provided with a clevis 24, which fits between a pair of clevis plates 27 and 28, see FIG. 3, secured, as by welding, to a transverse structural member 29 of the bus body. A clevis bolt or pin 30, see FIG. 3, secures the clevis member 24 in position between the plates 27 and 28.

The thrust fork beams 21 and 22 extend rearwardly beyond the axle housing 20, and a support beam 31, of a length corresponding substantially to the width of the bus body B is mounted transversely across the rear ends of the fork beams 21 and 22 rearwardly of the drive wheels 32 and 33.

Figure 6:
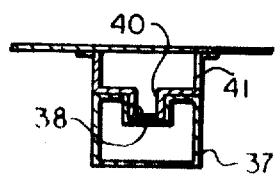
FIG. 6 is an enlarged, sectional view taken along line 6—6 of FIG. 3.

Spring suspension for the body B is provided by a pair of conventional air bag support members 34 and 35, mounted on the support beam 31 adjacent opposite ends thereof, their upper ends being connected in supporting relation to a transverse structural member 37 having a groove 38 extending lengthwise of the upper side thereof. The grooved member 37 is the forward element of the frame 39 of the power unit A, and the groove 38 is located to receive a tongue 40, see FIGS. 3 and 6, on the underside of a transverse structural body member 41 when the power unit is assembled with the body as shown in FIG. 3.

The remainder of the power unit frame 39, which is rectangular, comprises a pair of side members 42 and 43, a transverse rear member 44, a pair of longitudinal members 47 and 48, which also serve as engine bed stringers, and a pair of short, transverse brace members 49 and 50 which extend one between each side frame member and its corresponding engine bed stringer. The various parts of the power unit frame 39 are secured together in accordance with usual automotive practice as by welding, riveting or bolting.

A pair of anchor plates 51 and 51a, each with a row of holes 52 therein, is secured, as by welding, one to each of the power unit side frame members 42 and 43 for anchoring the power unit frame 39 to the bus body B by means of suitable fasteners, such as bolts, see FIG. 3. An antisway bar 53 is pivotally connected at one end thereof to the support beam 31, and at the other end thereof to the grooved, transverse frame beam 37, and usual shock absorbers 54 and 55 are mounted one between each end of the support beam 31 and the frame beam 37 thereabove.

The bus propulsion engine 18 is mounted in a conventional manner on the engine bed stringers 47 and 48, and is operatively connected to the drive wheels 32 and 33 by means of a conventional transmission mounted in a housing 57, drive shaft 58, universal joints 59 and 60, and usual differential gearing and axles, not shown, mounted in the axle housing 20.

A conventional engine cooling radiator 61 is mounted in a selected position on the power unit frame 39, and this radiator and the various other items of equipment and accessories used with the engine 18, and usually designated in their entirety as a "power package," are mounted in a designed manner on the power unit frame 39. Since the design and construction and such power package is individual to each type of bus and engine used, and is well within the capabilities of those apt to be assigned to such task, the details thereof are omitted.

A heating and air conditioning unit 62, see FIG. 1 and broken line outline in FIG. 3, with suitable or conventional bus heating or air conditioning equipment, or both, installed therein in a well known manner, is mounted on standards 63 anchored at their lower ends to the power unit frame 39. The heating and air conditioning equipment housing 62 preferably is constructed to be separately removable from the power unit frame 39 by means of suitable releasable fastening means, such as bolts, not shown. A bumper 64 is mounted in a conventional manner transversely across the rear end of the power unit frame 39 to transmit shock forces from the bumper to the frame.

The usual roof structure 65 of the bus body B extends rearwardly beyond the rear wall 11 sufficiently to overlie the various elements comprising the power unit A with the exception of the rear bumper 64, and a pair of non-structural doors 67 and 68 are hingedly mounted, one on the vertical rear end of each side wall of the body B. These doors are so shaped and mounted that when closed they conform to and complete the designed contours of the rear end of the body B. Grilled openings, such as those 69 and 70 of FIGS. 2 and 3, are provided in the doors as required, for example, to admit air for engine combustion and cooling, and passenger compartment ventilation, heating and cooling.

For supporting the unbalanced after end of the power unit A when the power unit is not mounted in a bus, a pivoted support wheel assembly C is provided. A support wheel 71 is journaled in a fork 72, which in turn is swiveled in a bearing 73 mounted on an I-beam 74. A towing tongue 75 extending from the fork 72 is provided for pushing, pulling and steering purposes. The beam 74 has a pair of upright attaching members 76 and 77 secured one to each end thereof and adapted to be attached by bolts 78, see FIG. 5, to the engine bed stringers 47 and 48 so as to position the wheel 71 in supporting position therebeneath. The support wheel assembly C, as shown in FIG. 5, is of such height that when it is mounted in supporting position beneath a power unit A with which it is to be used, the frame 39 of such power unit will be substantially level.

For rigidly interconnecting the support beam 31 and the grooved frame member 37 during such times as the power unit A is not mounted in a bus, two short lengths 79 and 80 of suitable metal pipe of substantial diameter are fitted between the beam 31 and member 37. A metal disk pad 81, see FIG. 6, of a size to fit within the bore of each of said pipe members, and having a threated hole axially therein, is welded to the upper side of the beam 31 just inwardly of each of the air bags 34 and 35. With the lower ends of the pipe members 79 and 80 fitted onto their respective pads 81, a stud 82 is inserted through a hole provided in the grooved member 37 and axially through its respective pipe member. These studs are screwed into the threaded holes provided in their respective pads 81 as shown in FIG. 4 and are drawn down snug to thereby anchor the beam 31 and member 37 rigidly in spaced relation.

OPERATION

It is assumed that a power unit A, completed, tested and ready to operate, has the beam 31 and member 37 secured rigidly in spaced relation by a pair of the pipe members 79 and 80, and studs 82 as shown in FIG. 5, and that a support wheel assembly C is mounted in supporting position beneath the power unit A as shown in FIGS. 1, 2, and 5, and described previously herein.

It is an important feature of the invention that mechanical assembly of the various elements of the power unit is done in optimum working position and with maximum access, and also facilitates complete functional testing of all operative components before the power unit is installed. Also, that all mechanical elements are completely exposed and accessible, including radiator, hoses, drive shafts, belts, and oil and refrigerant lines, where any leaks or misalignment would be readily visible.

By means of the towing tongue 75, the wheel 71 may be swiveled as required for steering purposes, and the power unit A is rolled and guided to "docked" position in the compartment 10 in the rear end of a bus body B as shown in FIG. 2, the rear end of the bus body B preferably having first been raised slightly to admit the power unit A freely therein. During such docking, the clevis 24 is guided between the plates 27 and 28, and the clevis bolt 30 is inserted as shown in FIG. 3 and secured. The bus body B is then lowered with the anchor plates 50 and 51 fitted inside their respective side walls of the bus body B. The clevis connection, plus the anchor plates 50 and 51, are located to guide the downwardly projecting tongue 40 of the transverse structural body member 41, see FIGS. 3 and 6, to seated, anchoring position in the groove 38 in the transverse frame member 37. Bolts or other suitable fastening means are then inserted in the holes 52 in the anchor plates 50 and 51, and in registering holes provided in the bus body B, to prevent the anchoring tongue 40 from leaving the groove 38 to the event of an unusually violent maneuver of the bus.

The heating and air conditioning unit 62 is mounted on the power unit A so that when the power unit is "docked" and secured in the bus body B as described previously herein, the unit 62 fits into the upper part of the compartment 10, and the duct openings 12, 13 and 14 in the rear wall 11 are in register with corresponding openings provided in the unit 62.

Various connections are required, such as, for example, those for the wiring and controls, are then made between the power unit A and the bus body B by means of suitable or conventional plugs, linkages, cables, and other suitable and well known means, preferably of the quick-disconnect type.

The support wheel assembly C and the pipe members 79 and 80 with their respective studs 82 are then removed, and the body B is lowered to resiliently supported position on the rear wheels. The compartment doors 67 and 68 are then closed, and the bus is ready to operate.

To remove the power unit A the foregoing procedure is reversed.

The invention provides a strong, sturdy power unit for a bus and one which, in addition to the advantages mentioned previously herein, can not only be quickly exposed for inspection and minor adjustment or repair, but which also can be quickly removed in its entirety for major service and overhaul, and a replacement power unit, pre-tested and ready to run, installed in its place with a minimum of labor, and also of down time for the bus.

Having thus described my invention, what is claimed as new and useful and desire to secure by U.S. Letters Patent is:

1. In combination with a bus body having a downwardly open power unit compartment in the rear end thereof, structural side wall elements on opposite sides of the bus body defining the two sides of the compartment, and a structural bulkhead comprising the rear end wall of the bus body spaced forwardly from the design rear end of the bus body, and defining the forward end of, the compartment, a removable power unit comprising:
   a power unit support frame fitted between the two sides of the compartment,
   means releasably, structurally connecting the power unit support frame to the two sides of the compartment,
   a rear drive wheel and axle assembly located forwardly of and below the level of the power unit support frame,
   suspension means interposed between the power unit support frame and the wheel and axle assembly and resiliently supporting upon the wheel and axle assembly, the power unit support frame and the bus body to which it is connected,
   a thrust and drag transmitting extension on the wheel and axle assembly extending forwardly therefrom,
   hitch means pivotally, releasably connecting the forward extension of the wheel and axle assembly to a structural element of the bus body, and
   a power package including a propulsion engine mounted on the power unit support frame, within the compartment, and in power driving relation with the drive wheel and axle assembly.

2. The combination defined in claim 1 wherein an air conditioning unit is fixedly mounted on the power unit frame within an upper portion of the compartment for removal with the power unit,
   the air conditioning unit having at least one conditioned air transmitting opening therein, and said bulkhead having at least one air receiving opening therein communicating with the passenger compartment of the bus body and with such air transmitting opening.

3. The combination defined in claim 2 wherein the bus body comprises a roof structure portion extending rearwardly beyond said rear bulkhead, such rearwardly extending roof portion comprising a roof for the compartment, and a plurality of non-structural doors conforming to the design shape of the rear end of the bus body when closed.

4. The combination defined in claim 1 wherein an anti-sway link extends generally transversely of the power unit and is pivotally connected at one end thereof to an element of the power unit frame, and the other end thereof to the wheel and axle assembly.

5. The combination defined in claim 1 wherein the thrust transmtting extension comprises a pair of forwardly converging beams connected one to each side of the drive wheel and axle assembly, a clevis is secured to the convergent forward ends of said beams, a clevis connection is secured to a structural element of the bus body, and a clevis pin releasably interconnects the clevis in pivotal relation to the clevis connection.

6. The combination defined in claim 1 wherein, when a transverse structural element of the bus body is lowered onto a forward element of the power unit support frame fitted between and connected to the side walls of the compartment whereby such transverse structural element and the bus body of which it is a part is supported on the power unit frame, and anchoring means fitted to the bus body and the power unit support frame, respectively, prevent relative fore-and-aft movement between the body and frame.

7. The combination defined in claim 6 wherein the anchoring means comprises a tongue and groove connection between the power unit frame and the transverse structural element of the bus body supported thereon, said tongue and groove connection extending transversely of the direction of forward movement of the bus, and separable upon upward movement of the bus body relative to the power unit frame.

8. The combination defined in claim 1 wherein the anchoring means comprises fasteners inserted in holes provided in the sides of the power unit frame and in the side walls of compartment between which said frame is fitted.

9. The combination defined in claim 1 wherein the rear drive wheel and axle assembly comprises, in addition to the drive wheels and axle and the thrust and drag transmitting forward extension on the wheel and axle assembly, and a structural rearward extension extending rearwardly beyond the rear drive wheels, the resilient suspension means being mounted on said rearward extension closely adjacent the sides of the bus.

10. The combination defined in claim 9 wherein the resilient support members are air bags containing compressed air.

11. The combination defined in claim 9 wherein removable tie-down means are provided between the rearward extension and the power unit frame, and retains the frame in spring loaded, depressed condition when the weight of the bus body is removed therefrom.

* * * * *